US010045623B2

(12) United States Patent
Bortolon et al.

(10) Patent No.: US 10,045,623 B2
(45) Date of Patent: Aug. 14, 2018

(54) VARIABLE-SIZED OCCUPANT SUPPORT

(71) Applicant: Faurecia Automotive Seating, LLC, Auburn Hills, MI (US)

(72) Inventors: Christopher A Bortolon, Commerce Township, MI (US); John D Newberry, Belleville, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 193 days.

(21) Appl. No.: 15/019,580

(22) Filed: Feb. 9, 2016

(65) Prior Publication Data

US 2016/0227932 A1    Aug. 11, 2016

Related U.S. Application Data

(60) Provisional application No. 62/115,197, filed on Feb. 12, 2015, provisional application No. 62/113,712, filed on Feb. 9, 2015.

(51) Int. Cl.
| | |
|---|---|
| *B60N 2/62* | (2006.01) |
| *B60N 2/02* | (2006.01) |
| *A47C 7/14* | (2006.01) |
| *B62J 1/08* | (2006.01) |
| *B60N 2/90* | (2018.01) |

(52) U.S. Cl.
CPC .............. *A47C 7/14* (2013.01); *B60N 2/0284* (2013.01); *B60N 2/62* (2013.01); *B60N 2/914* (2018.02); *B62J 1/08* (2013.01)

(58) Field of Classification Search
CPC ....... B60N 2/62; B60N 2/4415; B60N 2/0284
See application file for complete search history.

(56) References Cited

U.S. PATENT DOCUMENTS

| | | | |
|---|---|---|---|
| 4,401,343 A | | 8/1983 | Schmidt |
| 4,629,248 A | * | 12/1986 | Mawbey ................. B60N 2/62 |
| | | | 297/284.11 |
| 5,082,326 A | * | 1/1992 | Sekido ................ B60N 2/4415 |
| | | | 297/284.6 |
| 5,171,062 A | | 12/1992 | Courtois |
| 5,622,406 A | | 4/1997 | Meschkat |
| 6,267,445 B1 | | 7/2001 | Marais |
| 6,419,317 B1 | | 7/2002 | Westrich |
| 6,454,353 B1 | | 9/2002 | Knaus |
| 6,601,918 B2 | | 8/2003 | Mattsson |
| 6,926,361 B2 | | 8/2005 | Link |
| 7,108,322 B2 | | 9/2006 | Erker |

(Continued)

FOREIGN PATENT DOCUMENTS

| | | |
|---|---|---|
| DE | 4104697 | 3/1997 |
| DE | 102009019033 | 10/2010 |

(Continued)

OTHER PUBLICATIONS

International Search Report, Application No. PCT/KR2014/007284, dated Oct. 30, 2014.

*Primary Examiner* — Timothy J Brindley
(74) *Attorney, Agent, or Firm* — Barnes & Thornburg LLP

(57) ABSTRACT

An occupant-support base includes a stationary seat pan and a pad coupled to the seat pan. The pad is coupled to the seat pan and configured to provide comfort to an occupant resting on the occupant-support base and provide a pleasing aesthetic to the occupant.

19 Claims, 10 Drawing Sheets

(56) References Cited

U.S. PATENT DOCUMENTS

| | | |
|---|---|---|
| 7,192,087 B2 | 3/2007 | Adragna |
| 7,571,964 B2 | 8/2009 | Taniguchi |
| 7,578,554 B2 | 8/2009 | Lee |
| 7,611,201 B2 | 11/2009 | Moriyama |
| 7,669,928 B2 | 3/2010 | Snyder |
| 7,669,929 B2 | 3/2010 | Simon |
| 7,753,446 B2 | 7/2010 | Kubler |
| 7,874,621 B2 | 1/2011 | Gumbrich |
| 7,909,401 B2 | 3/2011 | Hofmann |
| 7,997,648 B2 | 8/2011 | Becker |
| 8,011,728 B2 | 9/2011 | Kohl |
| 8,128,167 B2 | 3/2012 | Zhong |
| 8,408,646 B2 | 4/2013 | Harper |
| 8,991,921 B2 | 3/2015 | Peterson |
| 9,016,783 B2 | 4/2015 | Line |
| 9,016,784 B2 | 4/2015 | Line |
| 9,016,785 B2 | 4/2015 | Freisleben |
| 9,321,373 B2 * | 4/2016 | Sakata ................ B60N 2/0284 |
| 9,365,142 B1 | 6/2016 | Line |
| 9,399,418 B2 | 7/2016 | Line |
| 9,421,885 B2 | 8/2016 | Wiegelmann |
| 9,527,417 B2 * | 12/2016 | Dry ........................ B60N 2/525 |
| 2008/0191531 A1 | 8/2008 | Hoffmann |
| 2008/0191532 A1 * | 8/2008 | Wain ........................ B60N 2/68 |
| | | 297/284.1 |
| 2009/0091172 A1 | 4/2009 | Kim |
| 2013/0257126 A1 | 10/2013 | Freisleben |
| 2014/0292051 A1 | 10/2014 | Planson |
| 2015/0258914 A1 | 9/2015 | Lee |
| 2016/0304016 A1 | 10/2016 | Line |
| 2016/0339803 A1 * | 11/2016 | Beuschel ................ B60N 2/66 |
| 2016/0339805 A1 | 11/2016 | Kim |
| 2016/0339806 A1 | 11/2016 | Popescu |
| 2016/0339820 A1 | 11/2016 | Kajino |

FOREIGN PATENT DOCUMENTS

| | | |
|---|---|---|
| DE | 102008004121 | 4/2011 |
| DE | 102011116449 | 4/2013 |
| DE | 202012214296 | 2/2014 |
| DE | 102008049923 | 4/2014 |
| EP | 3095638 | 11/2016 |
| FR | 2969546 | 6/2012 |
| GB | 22522723 | 8/1992 |
| JP | 07013244 U | 3/1995 |
| JP | 2000157376 A | 6/2000 |
| JP | 2003002090 A | 1/2003 |
| JP | 2007130228 | 5/2007 |
| JP | 4438564 | 3/2010 |
| KR | 1020090035090 A | 4/2009 |
| KR | 2020110011890 U | 12/2011 |
| KR | 1020130064139 A | 6/2013 |
| WO | 2010057335 | 5/2010 |
| WO | 2012055698 | 5/2012 |
| WO | 2012107675 A1 | 8/2012 |
| WO | 2016120143 | 8/2016 |

* cited by examiner

VARIABLE-SIZED OCCUPANT SUPPORT

PRIORITY CLAIM

This application claims priority under 35 U.S.C. § 119(e) to U.S. Provisional Application Ser. No. 62/115,197, filed Feb. 12, 2015 and U.S. Provisional Application Ser. No. 62/113,712, filed Feb. 9, 2015, each of which is expressly incorporated by reference herein.

BACKGROUND

The present disclosure relates to an occupant support, and particularly to an occupant support used in a vehicle. More particularly, the present disclosure relates to an occupant support having a variable dimension.

SUMMARY

According to the present disclosure, an occupant-support base includes a stationary seat pan and a pad coupled to the seat pan. The pad is coupled to the seat pan and configured to provide comfort to an occupant resting on the occupant-support base and provide a pleasing aesthetic to the occupant. The pad includes a cushion cover arranged to cover the seat pan and a cushion located between the seat pan and the cushion cover.

In illustrative embodiments, the occupant-support base further includes a pad-extension system. The pad-extension system is configured to provide means for moving a portion of the pad relative to the seat pan between a retracted configuration and an extended configuration so that support to an occupant is maximized while aesthetics are maximized.

In illustrative embodiments, the pad-extension system includes a pan mount coupled to the seat pan in a fixed position, a movable pad support, and a pad-support mover. The movable pad support is coupled to the pan mount to move back and forth relative to the seat pan. The pad-support mover is arranged to extend between and interconnect the movable pad support and the pan mount to cause the movable pad support to move back and forth.

In illustrative embodiments, the pad-support mover is an inflatable bladder arranged between the movable pad support and the pan mount. The inflatable bladder pushes the movable leg support away from the pan mount when inflated to cause the pad-extension system to assume the expanded configuration. Return springs are provided in the illustrative embodiment to pull the movable pad support back toward the pan mount when the inflatable bladder is deflated to cause the pad-extension system to assume the retracted configuration.

In illustrative embodiments, the movable leg support rotates about an axis relative to the pan mount between the retracted and the expanded configurations. In illustrative embodiments, the movable leg support translates and slides relative to the pan mount between the retracted and expanded configurations.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a side elevation view of a portion of a first embodiment of an occupant-support base in accordance with the present disclosure showing that the occupant-support base includes a seat pan and a pad-extension system coupled to the seat pan to change a size of a pad included in the occupant-support base by moving between a retracted configuration suggested here and in FIG. 4 and an expanded configuration suggested here and in FIG. 5 to change an overall length and height of the occupant-support base;

Figure 6:
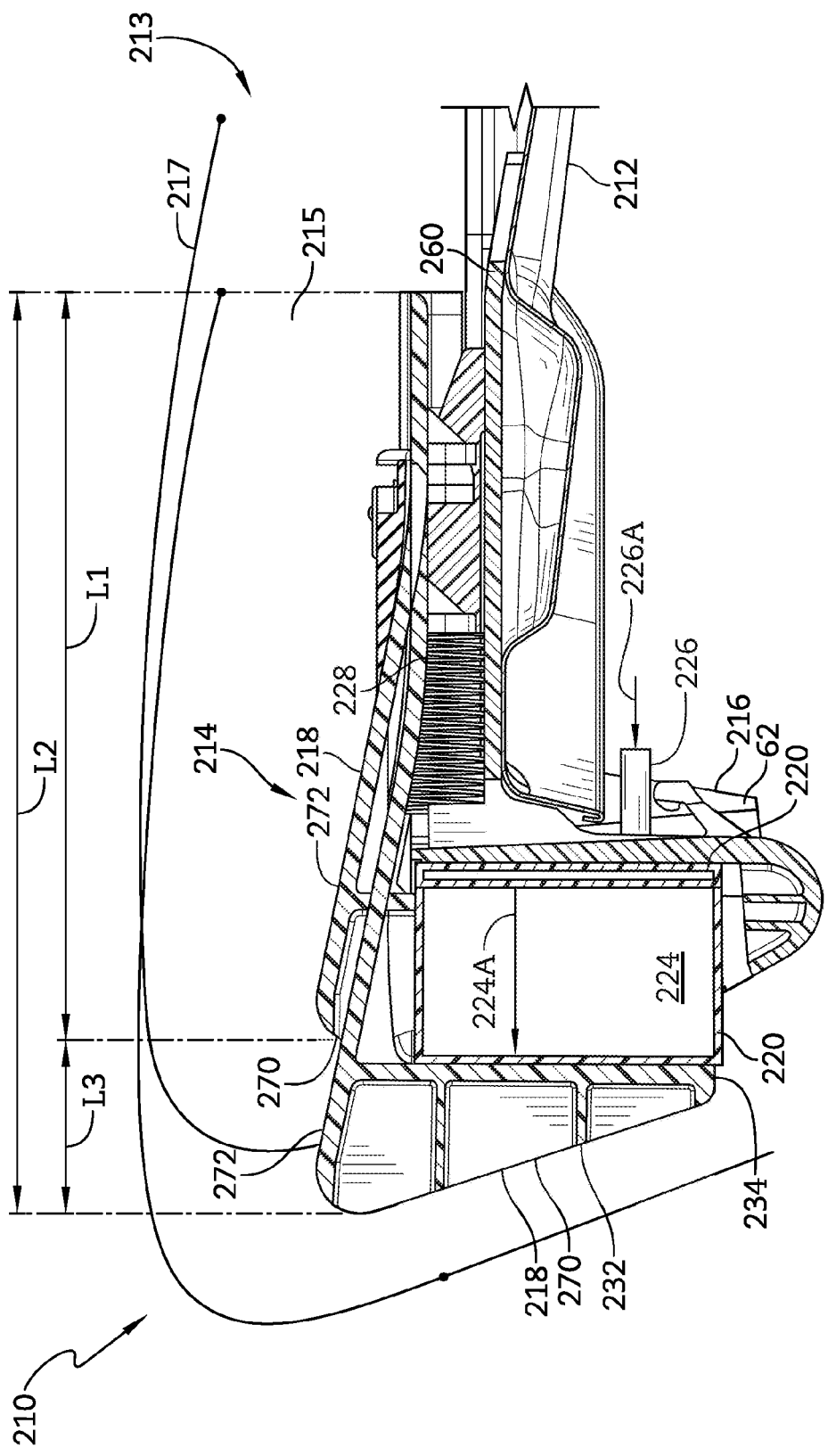
Figure 7:
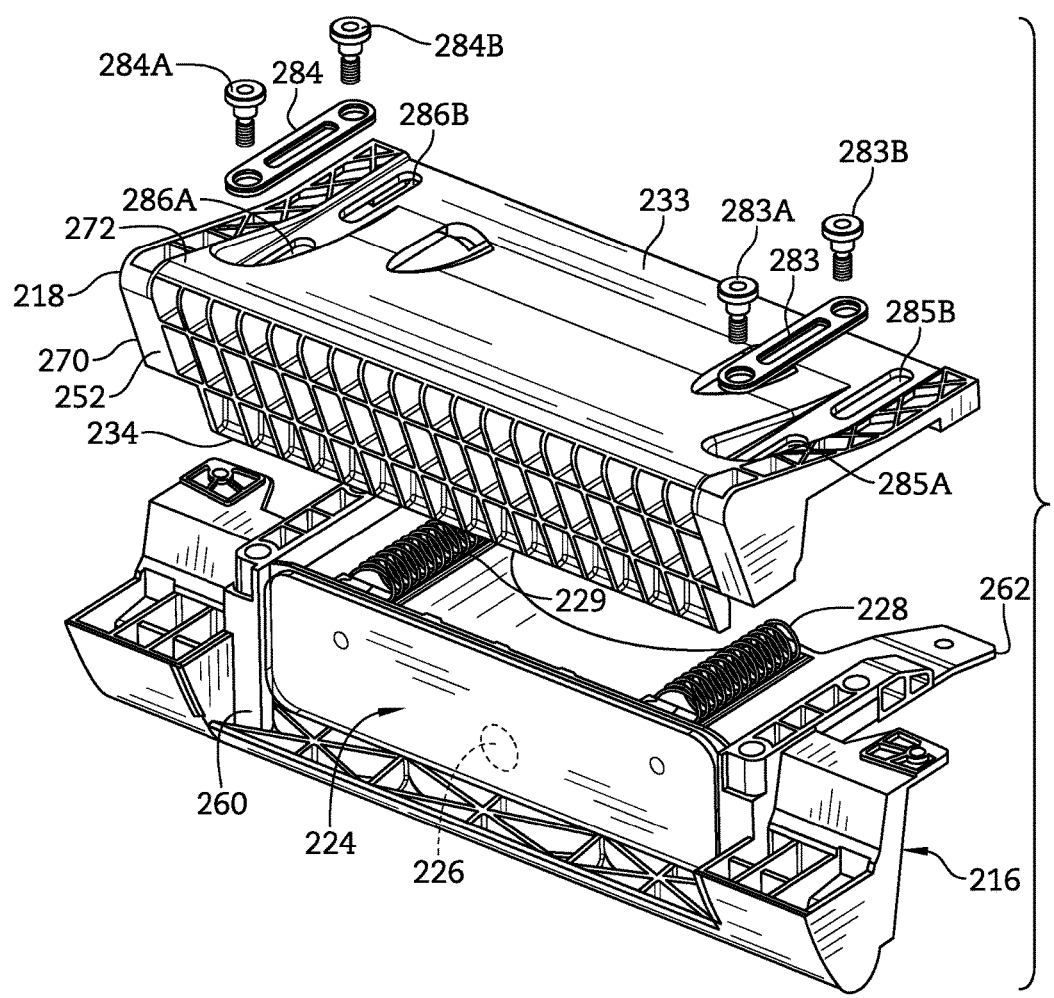
Figure 8:
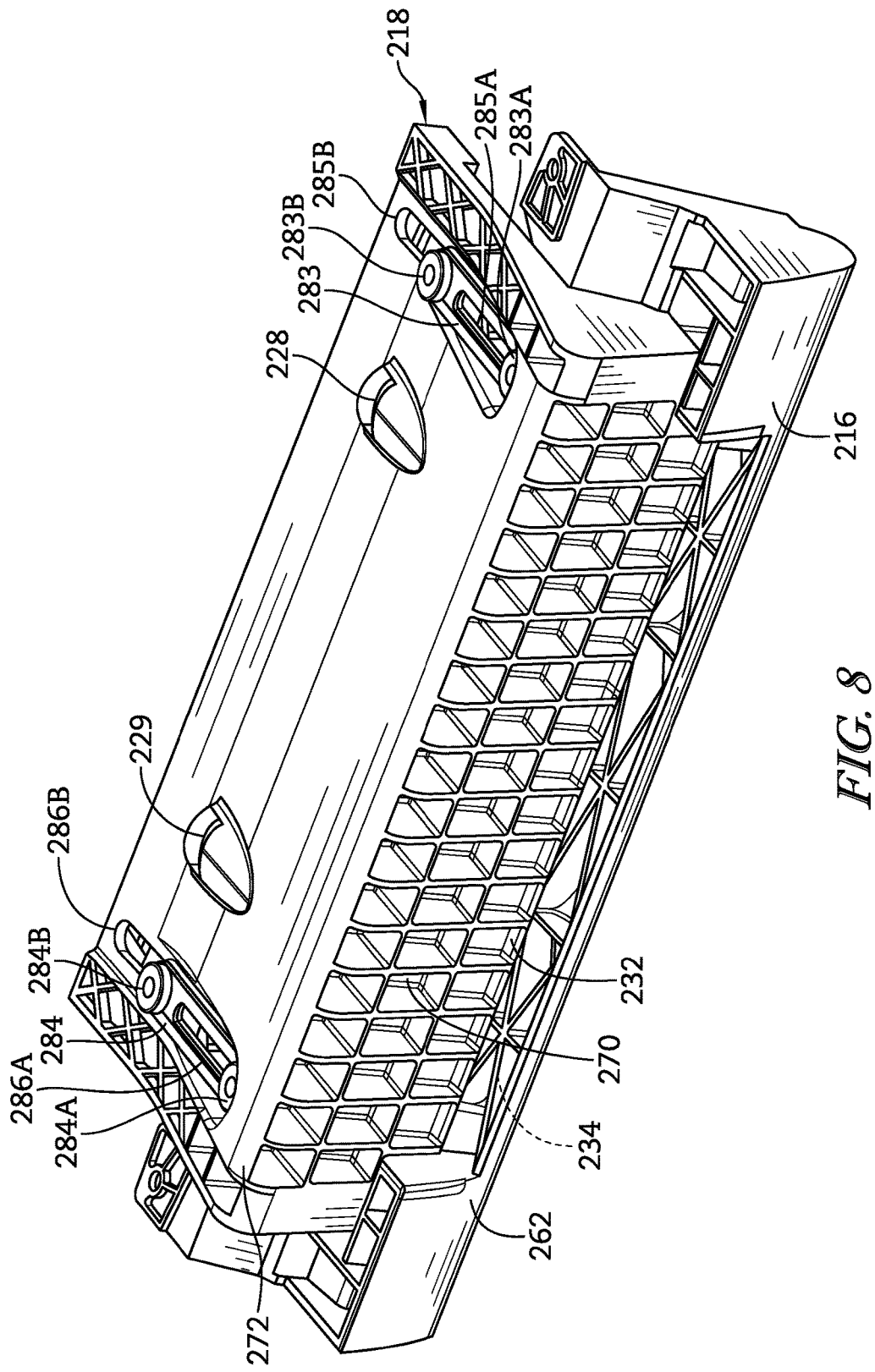
Figure 9A:
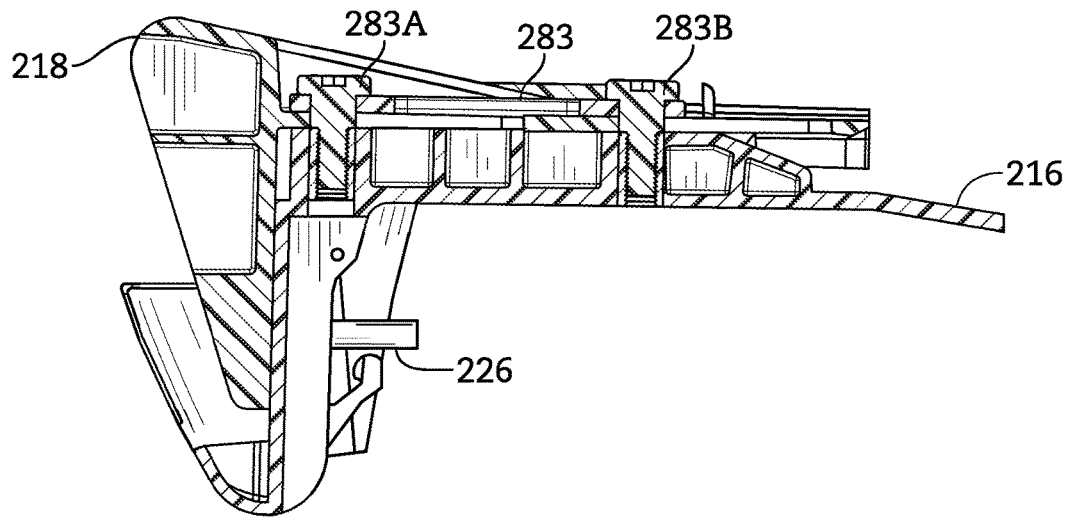
Figure 9B:
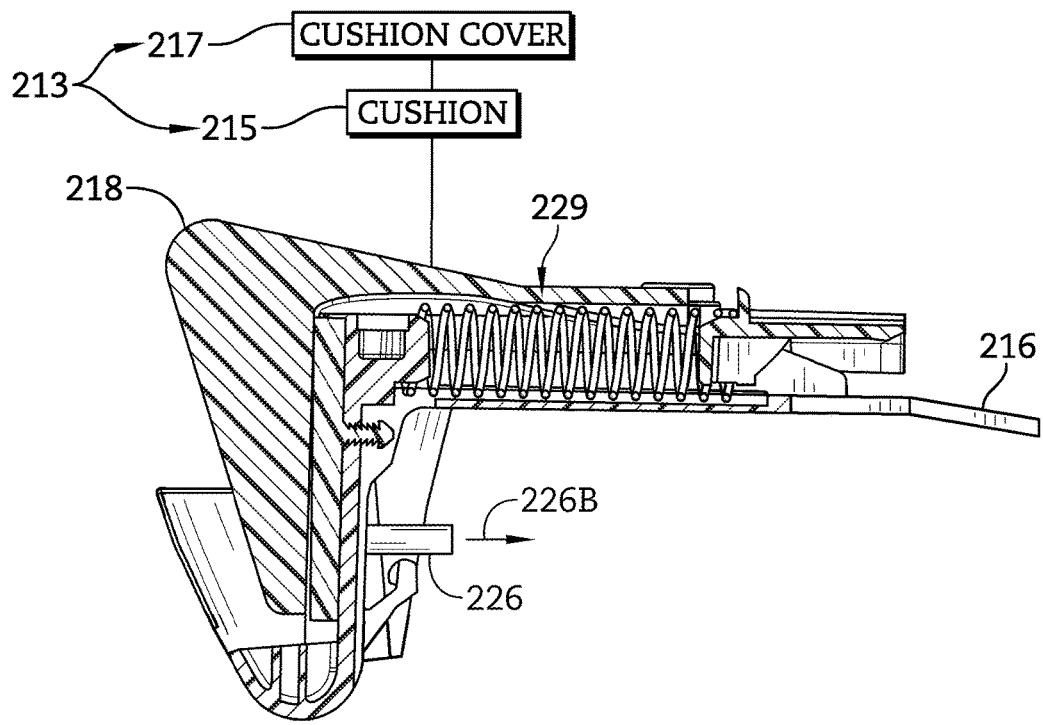
Figure 10A:
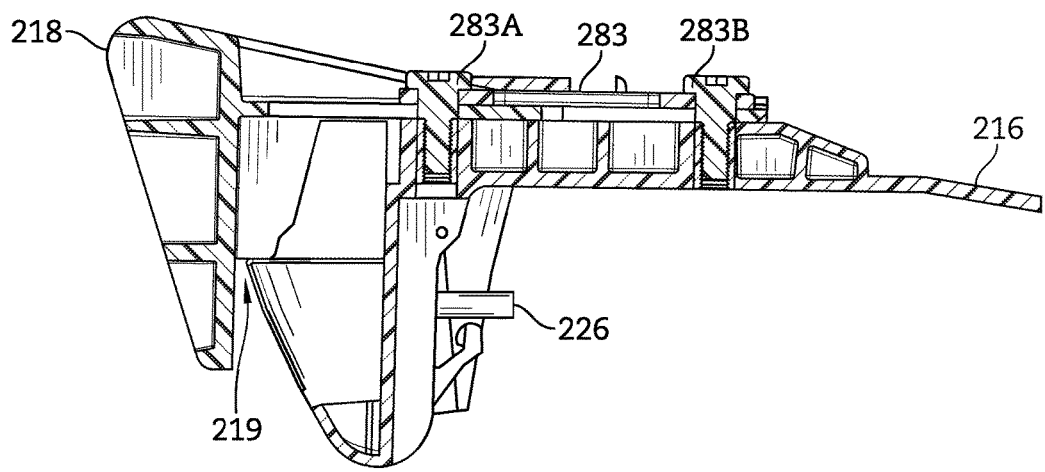
Figure 10B:
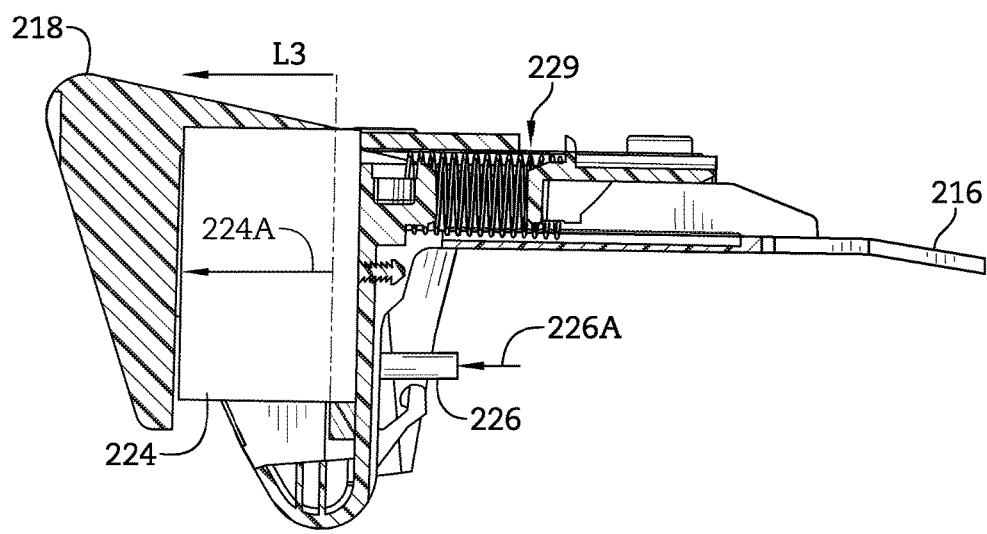

FIG. 6 is a side elevation view of a second embodiment of an occupant-support base in accordance with the present disclosure showing that the occupant-support base includes a seat pan and a pad-extension system coupled to the seat pan to change a size of a pad included in the occupant-support base by moving between a retracted configuration suggested here and in FIGS. 9A and 9B and an expanded configuration suggested here and in FIGS. 10A and 10B;

FIG. 7 is an exploded assembly view of the pad-extension system of FIG. 6 showing that the pad-extension system includes, from bottom to top, a pan mount, a pair of return springs, a vertical pneumatic inflatable bladder, a movable pad support coupled to the pan mount to slide back and forth relative to the pan mount, a pair of mounting arms, and four mounting fasteners;

FIG. 8 is a perspective view of the pad-extension system of FIGS. 6 and 7;

FIG. 9A is a view similar to FIG. 6 with the pneumatic inflatable bladder omitted showing the pad-extension system in the retracted configuration and the mounting arms at a first distance from a front side of the movable pad support;

FIG. 9B is a view similar to FIG. 9A showing the pad-extension system in the retracted configuration with the pneumatic inflatable bladder shown and the return springs providing a minimum return force;

FIG. 10A is a view similar to FIGS. 9A and 9B with the pneumatic inflatable bladder omitted showing the pad-extension system in the expanded configuration and the mounting arms are a relatively greater second distance from the front side of the movable pad support; and FIG. 10B is a view similar to FIG. 10A showing the pad-extension system in the expanded configuration with the return springs providing maximum return force.

DETAILED DESCRIPTION

A first embodiment of an occupant-support base 10 in accordance with the present disclosure is shown in FIGS. 1-5. A second embodiment of an occupant-support base 210 in accordance with the present disclosure is shown in FIGS. 6-10B. Occupant-support bases in accordance with the present disclosure each include a seat pan, a pad coupled to the seat pan, and a pad-extension system. Each pad-extension system is configured to provide means for moving a portion of the pad relative to the seat pan between a retracted configuration and an extended configuration to cause the occupant-support base to be customized to an occupant so that comfort of the occupant supported by the occupant-support base is maximized. Occupant-support bases 10, 210 may be used as a seat bottom, a backrest, a head rest, a bolster included in a backrest or seat bottom, an armrest, or any combination thereof.

Figure 1:
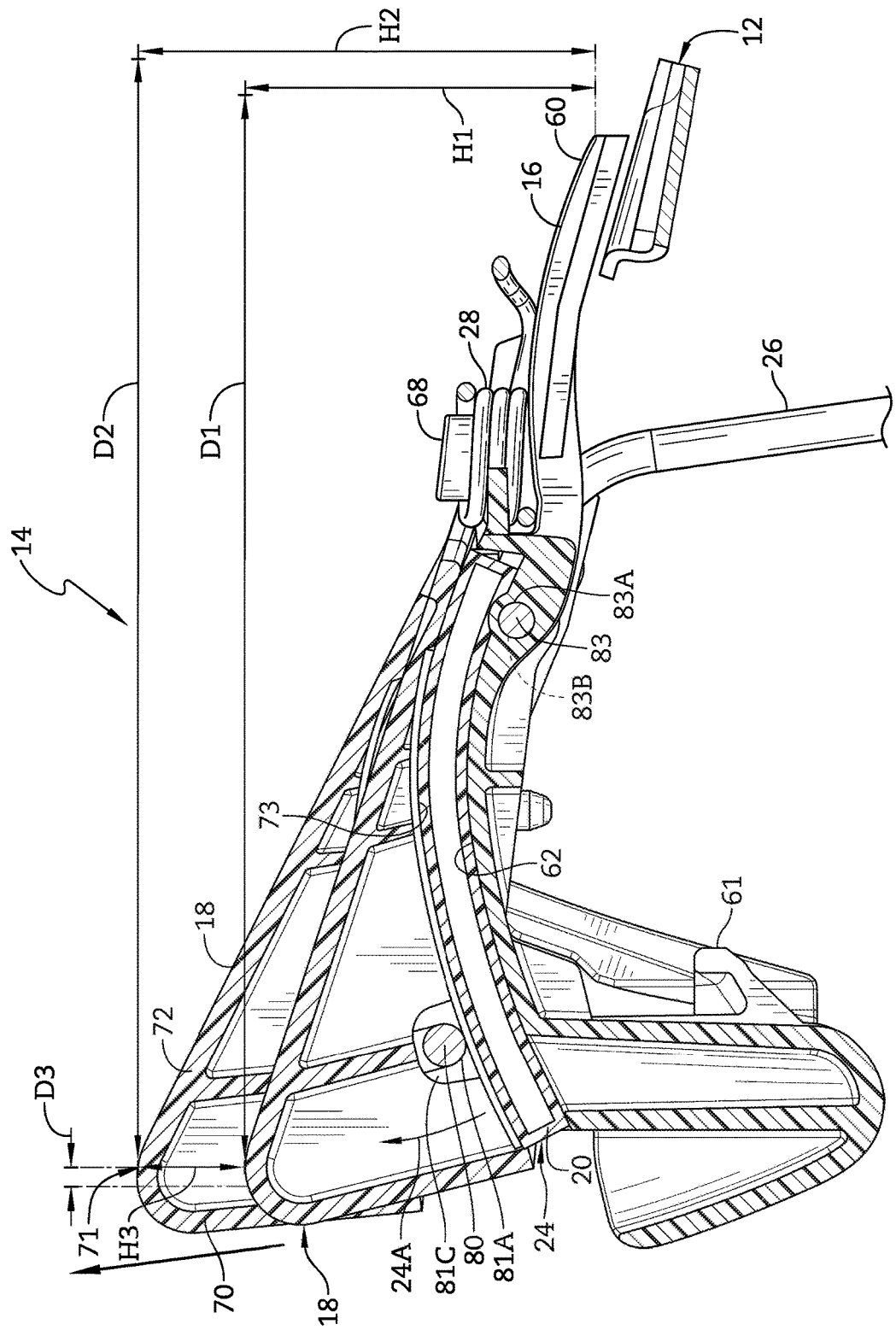
Figure 4:
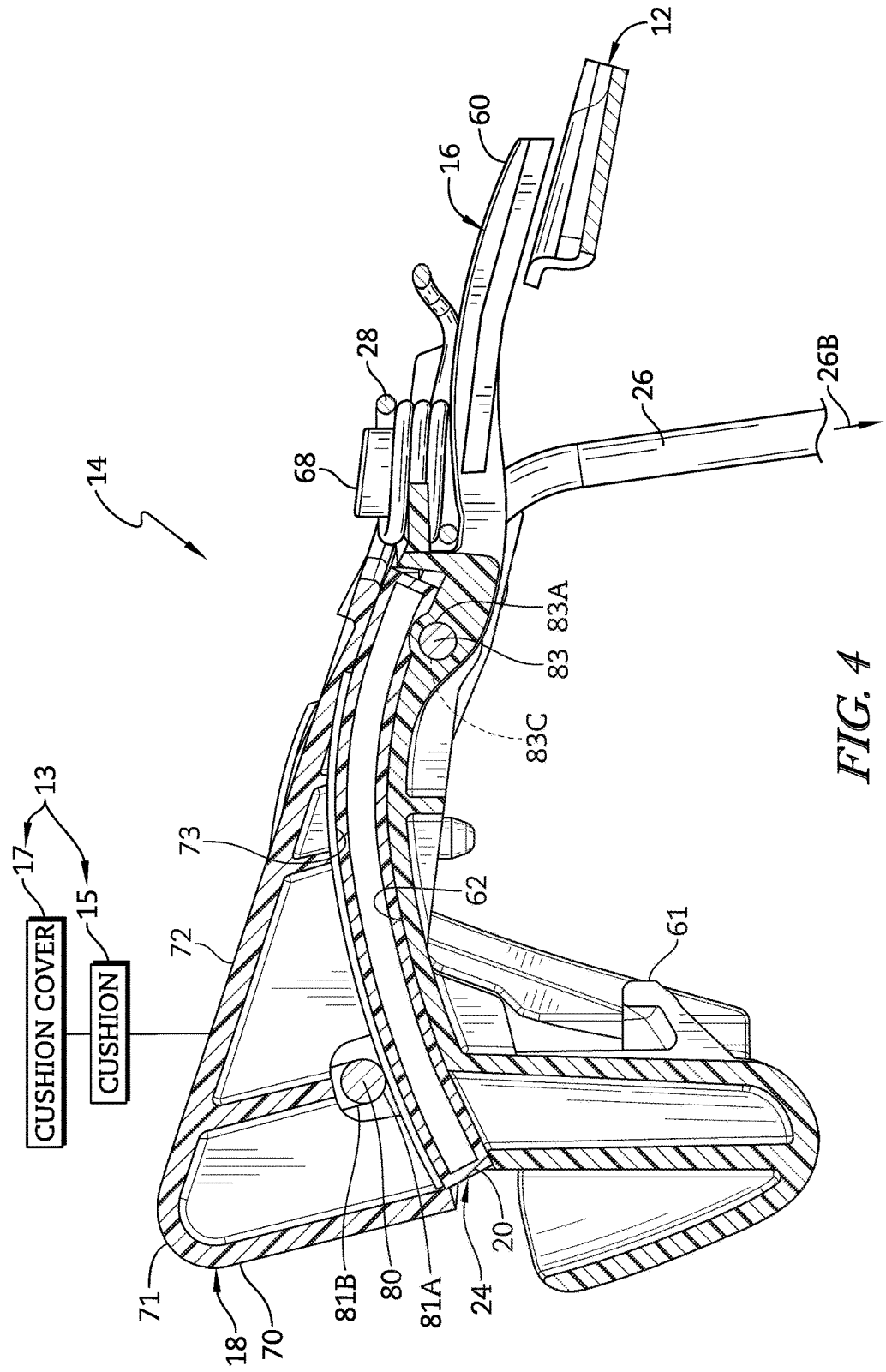
FIG. 4 is a view similar to FIG. 1 showing the pad-extension system in the retracted configuration with the shaft at a first distance from a mover-facing mount surface of the pan mount, an apex of the movable pad support at a first position, and the bias units providing a minimum amount of return force.
Figure 5:
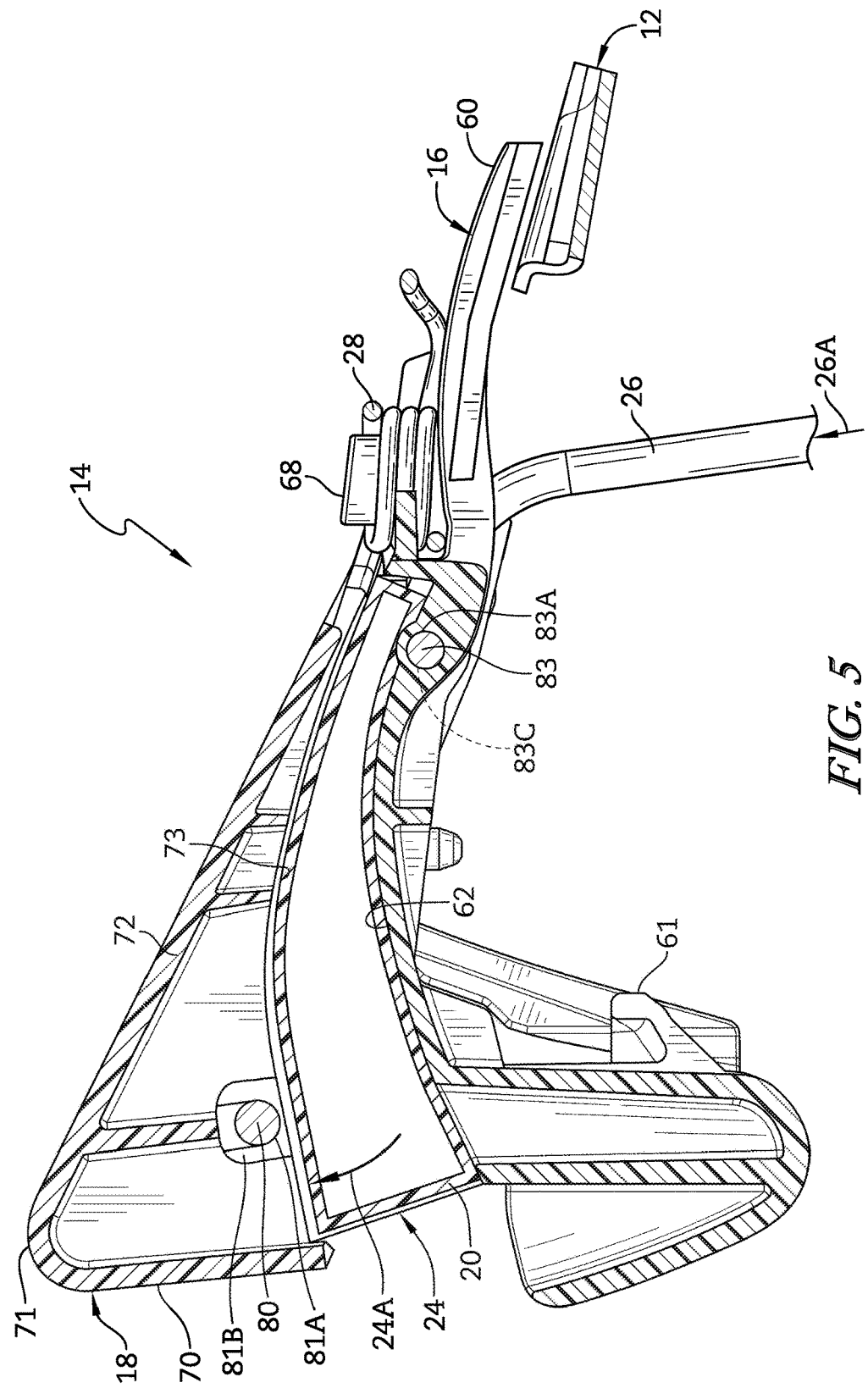
FIG. 5 is a view similar to FIG. 4 showing the pad-extension system in the expanded configuration with the shaft at a second distance from the mover-facing mount surface of the pan mount, the apex of the leg-support at a second position, and the bias units providing maximum amount of return force.

Occupant-support base 10, embodied as a seat bottom 10, is adapted for use in a vehicle seat as suggested in FIG. 1. Occupant-support base 10 includes a seat pan 12, a pad 13 coupled to seat pan 12, and a pad-extension system 14 coupled to seat pan 12. Pad-extension system 14 is configured to change a size and/or shape of pad 13 by moving between a retracted configuration as shown in FIG. 4 and an expanded configuration as shown in FIG. 5. Pad-extension system 14 changes a height of a front portion of pad 13 between a first height H1 associated with the retracted configuration and a relatively greater second height H2 associated with the expanded configuration as suggested in FIG. 1. Pad-extension system 14 also changes a length of pad 13 between a first depth D1 associated with the retracted configuration and a relatively greater second depth D2 associated with the expanded configuration as suggested in FIG. 1.

Figure 2:
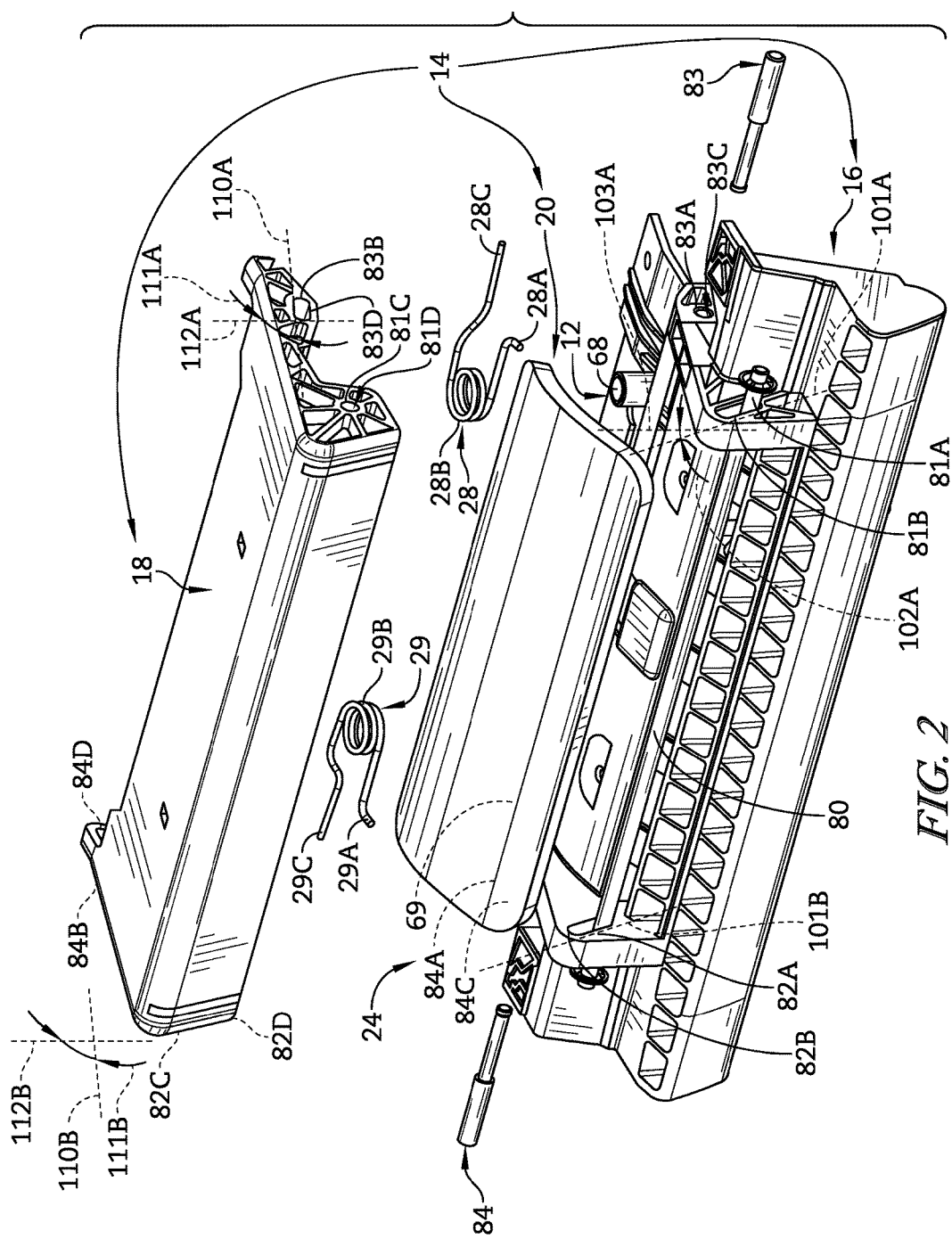
FIG. 2 is an exploded assembly view of the pad-extension system of FIG. 1 showing that the pad-extension system includes, from bottom to top, a pan mount, a shaft arranged to extend through first and second shaft-support receivers included in the pan mount, first and second rear guide pins, a pneumatic inflatable bladder, first and second bias units, and a movable pad support.

Pad-extension system 14 includes a pan mount 16, a movable pad support 18, and a pad-support mover 20 as shown, for example, in FIG. 2. Pan mount 16 is coupled to seat pan 12 of occupant-support base 10 in a fixed position relative to seat pan 12. Movable pad support 18 is coupled to pan mount 16 to pivot and slide back and forth relative to pan mount 16 when pad-extension system 14 moves between the retracted configuration and the expanded configuration. Pad-support mover 20 is located between pan mount 16 and movable pad support 18 and is configured to move movable pad support 18 relative to pan mount 16. Movable pad support 18, also called structure carrier 18, supports pad 13 that engage the legs of a user.

Pad 13 includes a cushion 15 and a cushion cover 17 as suggested in FIG. 4. In the example where occupant-support base 10 is a seat bottom, cushion cover 17 and cushion 15 extend over pad-extension system 14 to support the legs of an occupant supported by occupant-support base 10 as pad-extension system 14 moves between the retracted configuration and the expanded configuration. In some examples, pad 13 may further include a slack compensator configured to control wrinkles in cushion cover 17 as pad-extension system 14 moves between the retracted configuration and the expanded configuration. In one example, cushion 15 is made from or any other suitable alternative or combination. In one example, cushion cover 17 may be made from cloth, leather, or any other suitable alternative or combinations.

Figure 3:
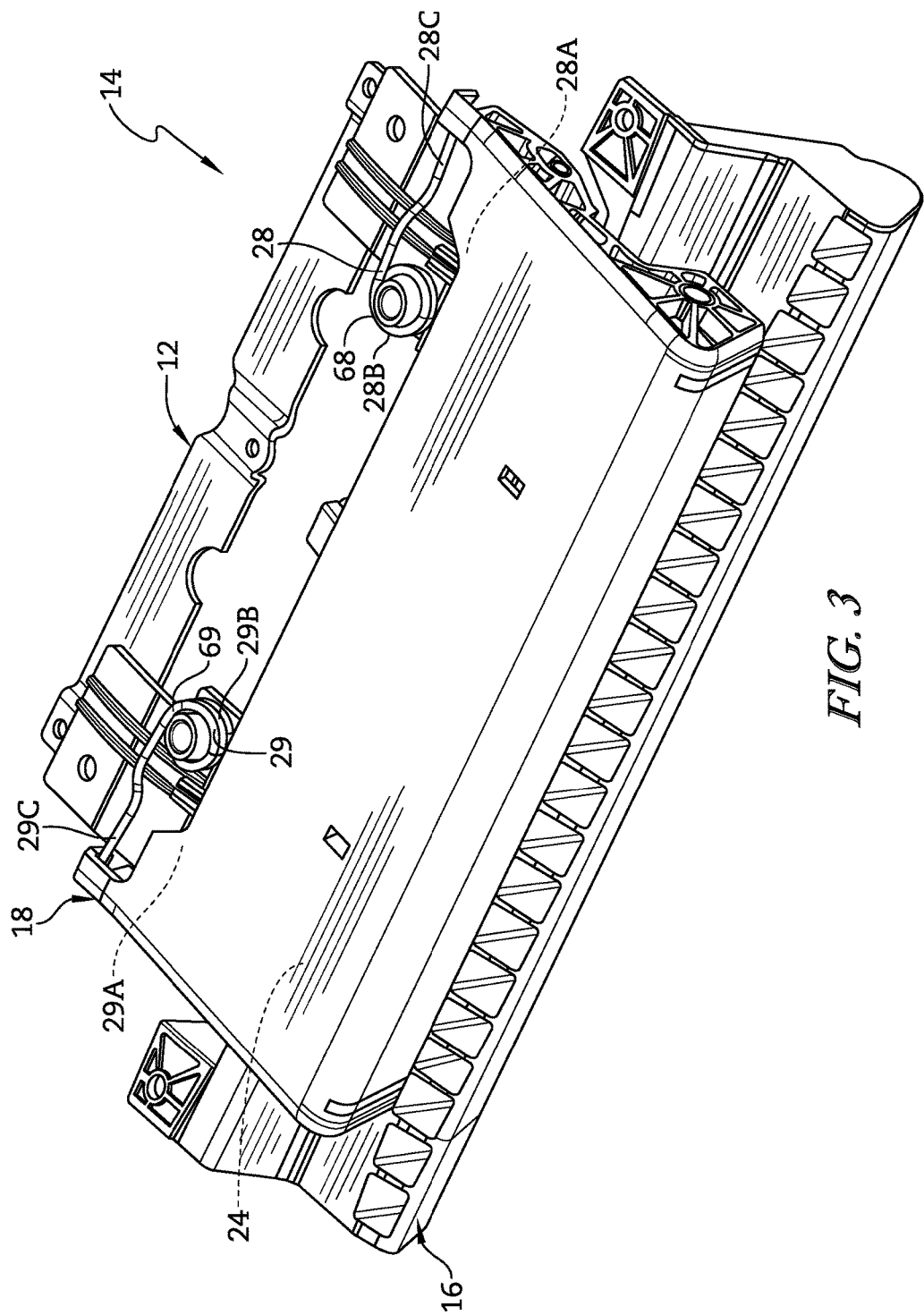
FIG. 3 is perspective view of the pad-extension system of FIGS. 1 and 2 in the retracted configuration showing the first and second bias units coupled to the pan mount and arranged to extend between and interconnect the movable pad support and the pan mount to cause the movable pad support to be biased toward the retracted configuration.

Pad-support mover 20 is, for example, a pneumatic inflatable bladder 24 configured to push movable pad support 18 away from pan mount 16 when pneumatic inflatable bladder 24 is inflated as suggested by an arrow 24A shown in FIGS. 1 and 5. As shown in FIG. 3, a first bias unit 28, also included in pad-extension system 14 is coupled to a first bias-unit mount 68 included in pan mount 16. A second bias unit 29 included in pad-extension system 14 is coupled to a second bias-unit mount 69 also included in pan mount 16. Bias units 28, 29 are arranged to interconnect pan mount 16 and movable pad support 18 to bias movable pad support 18 toward pan mount 16 when pneumatic inflatable bladder 24 is deflated. Bias units 28, 29 bias movable pad support 18 toward pan mount 16 to cause pad-extension system 14 to move from the expanded to the retracted configuration.

A maximum change in height H3 and a maximum change in depth D3 traveled by movable pad support 18 between the fully retracted configuration and the fully expanded configuration may be modified for various embodiments in accordance with the present disclosure. In the illustrative embodiment, as suggested by FIG. 1, about 90% of the movement is a change in height, and about 10% of the movement is a change in depth.

Pneumatic inflatable bladder 24 inflates in response to air entering pneumatic inflatable bladder 24 through a feed tube 26 as suggested by an arrow 26A as shown in FIG. 5. Inflation of pneumatic inflatable bladder 24 pushes movable pad support 18 away from pan mount 16 causing pad-extension system 14 to expand. Air may be forced through feed tube 26 as suggested by arrow 26A by a source of pressurized air. A pressure gradient across feed tube 26 is generated to cause pneumatic inflatable bladder 24 to inflate.

Pad-extension system 14 further includes a shaft 80, a first rear guide pin 83, and a second rear guide pin 84, as shown in FIG. 2. Shaft 80 and rear guide pins 83, 84 are arranged to interconnect pan mount 16 and movable pad support 18. When pneumatic inflatable bladder 24 inflates, shaft 80 and rear guide pins 83, 84 cooperate to constrain and guide movement of movable pad support 18 as pneumatic inflatable bladder 24 pushes movable pad support 18 away from pan mount 16. When pneumatic inflatable bladder 24 deflates, shaft 80 and rear guide pins 83, 84 cooperate to constrain and guide movement of movable pad support 18 as bias units 28, 29 bias movable pad support 18 toward pan mount 16.

Shaft 80 is coupled to pan mount 16 to move relative to pan mount 16 as movable pad support 18 moves relative to pan mount 16. Movement of shaft 80 is constrained by first and second shaft-mount receivers 81A, 82A as shown in FIG. 2. First shaft-mount receiver 81A is spaced apart laterally from second shaft-mount receiver 82A as shown in FIG. 2. First shaft-mount receiver 81A is formed to include a shaft-mount slot 81B therein. Second shaft-mount receiver 82A is formed to include a shaft-mount slot 82B therein. Each shaft-mount slot 81B, 82B is arranged to extend along an angled axis 101A, 101B with both angled axes 101A, 101B arranged to lie in co-planar relation to one another. In an illustrative example, angled axis 101A forms an angle 102A between angled axis 101A and a vertical reference line 103A. In an illustrative example, angle 102A is in a range of about 0 degrees and 30 degrees.

Shaft 80 is arranged to extend through and move along both mount slots 81B, 82B. Shaft 80 is also arranged to extend through first and second shaft-support receivers 81C, 82C included in movable pad support 18. First shaft-support receiver 81C is formed to include a cylindrical shaft-support passageway 81D therein. Second shaft-support receiver 82C is formed to include a cylindrical shaft-support passageway 82D therein. As shown in FIG. 2, both cylindrical shaft-support passageways 81D, 82D are arranged to lie in collinear relation with their respective center points aligned with a center point of shaft 80.

First rear guide pin 83 is coupled to pan mount 16 in rotative bearing engagement with pan mount 16 and movable pad support 18 to move relative to movable pad support 18. Movement of first rear guide pin 83 is constrained by a first rear-mount guide-pin receiver 83A included in pan mount 16 and a first rear-support guide-pin receiver 83B included in movable pad support 18 as shown in FIG. 2. First rear-mount guide-pin receiver 83A is formed to include a rear cylindrical passageway 83C therein. First rear-support guide-pin receiver 83B is formed to include a rear support slot 83D therein. Rear support slot 83D is arranged to extend along a rear angled axis 110A. In an illustrative example, rear angled axis 110A forms an angle 111A between rear angled axis 110A and a vertical reference line 112A. In an illustrative example, angle 111A is in a range of about 60 degrees to 90 degrees.

Second rear guide pin 84 is coupled to pan mount 16 in rotative bearing engagement with pan mount 16 and movable pad support 18 to move relative to movable pad support 18. Movement of second rear guide pin 84 is constrained by a second rear-mount guide-pin receiver 84A included in pan mount 16 and a second rear-support guide-pin receiver 84B included in movable pad support 18 as shown in FIG. 2. Second rear-mount guide-pin receiver 84A is formed to include a rear cylindrical passageway 84C therein. Second rear-support guide-pin receiver 84B is formed to include a rear-support slot 84D therein. Rear-support slot 84D is arranged to extend along a rear angled axis 110B. In an illustrated example, rear angled axis 110B forms an angle 111B between rear angled axis 110B and a vertical reference line 112B. In an illustrative example, angle 111B is in a range of about 60 degrees to 90 degrees. The two vertical reference lines 112A, 112B associated rear support slots 83D, 84D are arranged to lie in coplanar relation to one another.

As pad-extension system 14 moves from the expanded configuration to the retracted configuration, shaft 80 slides down and backward relative to pan mount 16 along angled axes 101A, 101B of spaced-apart shaft-mount slots 81B, 82B. Shaft 80 remains aligned with cylindrical shaft-support passageways 81D, 82D formed in movable pad support 18 as movable pad support 18 moves toward pan mount 16.

First rear guide pin 83 is coupled to pan mount 16 at first rear-mount guide-pin receiver 83A and coupled to movable pad support 18 at first rear-support guide-pin receiver 83B. As pad-extension system 14 moves between the retracted and expanded configurations, first rear guide pin 83 rotates in rear cylindrical passageway 83C and slides up and forward relative to pan mount 16 along rear support slot 83D formed in movable pad support 18. First rear guide pin 83 remains aligned with rear cylindrical passageway 83C of pan mount 16.

Second rear guide pin 84 is coupled to pan mount 16 at second rear-mount guide-pin receiver 84A and coupled to movable pad support 18 at second rear-support guide-pin receiver 84B. As pad-extension system 14 moves between the retracted and expanded configurations, second rear guide pin 84 rotates in rear cylindrical passageway 84C and slides up and forward relative to pan mount 16 along rear support slot 84D formed in movable pad support 18. Second rear guide pin 84 remains aligned with rear cylindrical passageway 84C of pan mount 16.

First bias unit 28 includes a first arm 28A, a second arm 28C, and a body 28B connected therebetween, as shown in FIG. 2. As shown in FIG. 3, body 28B is coupled to pan mount 16 at first bias-unit mount 68. First arm 28A is coupled to pan mount 16, second arm 28C is coupled to movable pad support 18, and first bias unit 28 is arranged to bias movable pad support 18 toward pan mount 16 when pneumatic inflatable bladder 24 is deflated and pad-extension system 14 is moved from the expanded configuration to the retracted configuration.

Second bias unit 29 includes a first arm 29A, a second arm 29C, and a body 29B connected therebetween, as shown in FIG. 2. As shown in FIG. 3, body 29B is coupled to pan mount 16 at second bias-unit mount 69. First arm 29A is coupled to pan mount 16, second arm 29C is coupled to movable pad support 18, and second bias unit 29 is arranged to bias movable pad support 18 toward pan mount 16 when pneumatic inflatable bladder 24 is deflated and pad-extension system 14 is moved from the expanded configuration to the retracted configuration.

In some embodiments, bias units 28, 29 may be tension springs or other biasing members arranged to cause movable pad support 18 to be biased to move toward pan mount 16 when pad-extension system 14 is not in the retracted configuration. When air exits pneumatic inflatable bladder 24 through feed tube 26, or any other suitable alternative, as suggested by an arrow 26B, shown in FIG. 4, pneumatic inflatable bladder 24 deflates. As pneumatic inflatable bladder 24 deflates, bias units 28, 29 apply a biasing force to movable pad support 18 to cause movable pad support 18 to move toward pan mount 16 causing pad-extension system 14 to retract. Air may be forced through feed tube 26 as suggested by arrow 26B as a result of the biasing force supplied by bias units 28, 29, or any other suitable alternative.

Pan mount 16, also called substrate 16, is a monolithic component in illustrative embodiments. Pan mount 16 is formed to include a pan-mount panel 60 and a mount body 61 as shown in FIG. 1. Pan-mount panel 60 is substantially horizontal and is fixed to seat pan 12 as suggested in FIG. 1. Mount body 61 extends upwardly and downwardly from pan-mount panel 60 and provides a mover-facing mount surface 62 for pad-support mover 20 to engage and push against when moving movable pad support 18 relative to pan mount 16. Pan-mount panel 60 includes first bias-unit mount 68 and second bias-unit mount 69.

Movable pad support 18 moves relative to seat pan 12 from a first position near mount body 61 when pad-extension system 14 is in the retracted configuration as suggested by FIG. 4 to a second position further away from mount body 61 when pad-extension system 14 is in the expanded configuration as suggested by FIG. 5. Movable pad support 18 is illustratively a monolithic component formed to include a forward body 70, a rearward body 72, and an apex 71 located at the highest point of intersection between forward body 70 and rearward body 72. Leg support apex 71 moves up by maximum height H3 and forward by maximum depth D3 when pad-extension system 14 moves from the fully retracted configuration to the fully expanded configuration. Forward body 70 includes first and second shaft receivers 81A, 82A as shown in FIG. 2. Forward body 70 provides a mover-facing leg-support surface 73 for pad-support mover 20 to engage and push against when moving movable pad support 18 relative to pan mount 16 as shown in FIG. 1. Rearward body 72 includes first and second rear-mount guide-pin receivers 83A, 84A as shown in FIG. 2. Rearward body 72 engages second arm 28C of first bias unit 28 and engages second arm 29C of second bias unit 29 as shown in FIG. 3.

Other structures may provide the pivoting and sliding movement of a leg support relative to a mount as suggested in FIGS. 4 and 5. In an embodiment, a leg support includes a plurality of studs that are each coupled to one of a plurality of slots in a mount. The plurality of slots in the mount constrain and guide the leg support as movement of the leg support as a leg-support mover pushes the leg support away from the mount. The plurality of slots in the mount cooperate to constrain and guide movement of the leg support as a biasing mechanism biases the leg support toward the mount.

In an illustrative embodiment, a mount includes a plurality of studs that are each coupled to one of a plurality of slots in a leg support. The plurality of slots in the leg support constrain and guide movement of the leg support as a leg-support mover pushes the leg support away from the mount. The plurality of slots in the leg support cooperate to constrain and guide movement of the leg support as a biasing mechanism biases the leg support to move toward the mount.

In an embodiment, a front shaft and a rear shaft extend between and interconnect a leg support and a mount. A plurality of slots, passageways, or combinations thereof cooperate to constrain and guide movement of the leg support as the leg support pivots and slides relative to the mount.

In an embodiment, a single shaft extends between and interconnects a leg support and a mount. A plurality of slots, passageways, or combinations thereof cooperate to constrain and guide movement of the leg support as the leg support pivots and slides relative to the mount.

In an embodiment, a snap-in ball joint couples a leg support and a mount. The snap-in ball joint constrains and guides movement of the leg support as the leg support pivots and slides relative to the mount.

Any other suitable mechanism may be used in accordance with the present disclosure to provide the pivoting and sliding movement of a leg support relative to a mount in accordance with the present disclosure as suggested in FIGS. 4 and 5. Any suitable combination of mechanisms as disclosed herein may also be used to constrain and guide movement of a leg support as the leg support to pivots and slides relative to a mount.

An occupant-support base 210, embodied as a seat bottom 210, in accordance with the present disclosure is adapted for use in a vehicle seat as suggested in FIG. 6. Occupant-support base 210 includes a seat pan 212, a pad 213 coupled to seat pan 212, and a pad-extension system 214 coupled to seat pan 212. Pad-extension system 214 is configured to change the size of occupant-support base 210 by moving between a retracted configuration as shown in FIGS. 9A & 9B and an expanded configuration as shown in FIGS. 10A & 10B. Pad-extension system 214 changes the length of occupant-support base 210 between a first length L1 associated with the retracted configuration and a relatively greater second length L2 associated with the expanded configuration as suggested in FIG. 6.

Pad-extension system 214 includes a pan mount 216, a movable pad support 218, and a pad support mover 220 as shown, for example, in FIG. 7. Pan mount 216 is coupled to seat pan 212 of occupant-support base 210 in a fixed position relative to seat pan 212. Movable pad support 218 is coupled to pan mount 216 to slide back and forth relative to pan mount 216 when pad-extension system 214 moves between the retracted configuration and the expanded configuration. Pad support mover 220 is located between pan mount 216 and movable pad support 218 and is configured to move movable pad support 218 relative to pan mount 216.

Pad 213 includes a cushion 215 and a cushion cover 217 as suggested in FIGS. 6 and 9B. In the example where occupant-support base 210 is a seat bottom, cushion cover 217 and cushion 215 extend over pad-extension system 214 to support the legs of an occupant supported by occupant-support base 210 as pad-extension system 214 moves between the retracted configuration and the expanded configuration. In some examples, pad 213 may further include a slack compensator configured to control wrinkles in cushion cover 217 as pad-extension system 214 moves between the retracted configuration and the expanded configuration. In one example cushion 215 is made from or any other suitable alternative or combination. In one example, cushion cover 217 may be made from cloth, leather, or any other suitable alternative or combinations.

Pad support mover 220 is, for example, a pneumatic inflatable bladder 224 configured to push movable pad support 218 away from pan mount 216 when pneumatic inflatable bladder 224 is inflated as suggested by an arrow 224A shown in FIGS. 6 & 10B. Return springs 228, 229 also included in pad-extension system 214 are located between and arranged to interconnect pan mount 216 and movable pad support 218 to bias movable pad support 218 toward pan mount 216 when pneumatic inflatable bladder 224 is deflated. Return springs 228, 229 bias movable pad support 218 toward pan mount 216 to cause pad-extension system 214 to move from the expanded to the retracted configuration.

A maximum distance L3 traveled by movable pad support 218 between the fully retracted configuration and the fully expanded configuration may be modified for various embodiments. In the illustrative embodiment, as suggested by FIG. 6, movable pad support 218 travels maximum distance L3 of about 30 mm.

Pneumatic inflatable bladder 224 inflates in response to air entering pneumatic inflatable bladder 224 through a feed tube 226 as suggested by an arrow 226A as shown in FIG. 10B. Inflation of pneumatic inflatable bladder 224 pushes movable pad support 218 away from pan mount 216 causing pad-extension system 214 to expand. Air may be forced through feed tube 226 as suggested by arrow 226A by a source of pressurized air. A pressure gradient across feed tube 226 is generated to cause pneumatic inflatable bladder 224 to inflate.

In some embodiments, return springs 228, 229 may be tension springs or other biasing members arranged to cause movable pad support 218 to be biased to move toward pan mount 216 when pad-extension system 214 is not in the retracted configuration. When air exits pneumatic inflatable bladder 224 through feed tube 226, or any other suitable alternative, as suggested by an arrow 226B, shown in FIG. 9B, pneumatic inflatable bladder 224 deflates. As pneumatic inflatable bladder 224 deflates, return springs 228, 229 provide a bias force to movable pad support 218 to cause movable pad support 218 to move toward pan mount 216 causing pad-extension system 214 to retract. Air may be forced through feed tube 226 as suggested by arrow 226B as a result of the bias force supplied by return springs 228, 229, or any other suitable alternative.

Pan mount 216, also called substrate 216, is a monolithic component formed to include a pan mount panel 260 and a face panel 262 as shown in FIG. 7. Pan mount panel 260 is substantially horizontal and is fixed to seat pan 212 as suggested in FIG. 6. Face panel 262 extends upwardly and downwardly from pan mount panel 260 and provides a surface for pad support mover 220 to engage and push against when moving movable pad support 218 relative to pan mount 216.

Movable pad support 218 moves relative to seat pan 212 from a first position near seat pan 212 when pad-extension system 214 is in the retracted configuration as suggested by FIG. 9 to a second position further away from seat pan 212 when pad-extension system 214 is in the expanded configuration as suggested by FIGS. 10A and 10B. Movable pad support 218 is illustratively a monolithic component formed to include a forward body 270 and an upper platform 272 as shown in FIG. 7. Forward body 270 defines a front side 232 of movable pad support 218 and is pushed away from pan mount 216 by pad support mover 220 as suggested in FIG. 6. Upper platform 272 extends rearwardly from forward body 270 to define a top side 233 of movable pad support 218. In the illustrative embodiment, at least a portion of pan mount 216, including face panel 262 of pan mount 216, is received by movable pad support 218 between a bottom side 234 of movable pad support 218 and upper platform 272 as shown in FIGS. 6-8. In the retracted configuration, bottom side 234 of movable pad support 218 rests on face panel 262 of pan mount 216.

Pan mount 216, movable pad support 218, and a mounting arm 283 are coupled by a pair of mounting fasteners 283A and 283B. Pan mount 216, movable pad support 218, and a mounting arm 284 are coupled by a pair of mounting fasteners 284A and 284B. Mounting fasteners 283A, 283B, 284A, and 284B are coupled to pan mount 216 in a fixed position relative to pan mount 216. Mounting fasteners 283A, 283B, 284A, and 284B are coupled to movable pad support 218 to allow movable pad support 218 to slide back and forth relative to mounting fasteners 283A, 283B, 284A, and 284B. When pad-extension system 214 is moved to the expanded configuration, front side 232 of movable pad support 218 moves away from pan mount 216 and mounting arms 283 and 284.

When pad-extension system 214 is moved to the retracted configuration, front side 232 of movable pad support 218 moves toward pan mount 216 and mounting arms 283 and 284. Movable pad support 218 is formed to include four spaced-apart slots 285A, 285B, 286A, and 286B as shown in FIG. 7. Mounting fastener 283A is arranged to extend through slot 285A and mate with pan mount 216. Mounting fastener 283B is arranged to extend through slot 285B and mate with pan mount 216. Mounting fastener 284A is arranged to extend through slot 286A and mate with pan mount 216. Mounting fastener 284B is arranged to extend through slot 286B and mate with pan mount 216 as shown in FIG. 7. Each slot 285A, 285B, 286A, and 286B includes a first end and a spaced-apart second end.

When pad-extension system 214 is in the retracted position as shown in FIG. 8, mounting fasteners 283A, 283B, 284A, 284B are arranged to engage the first end of each associated slot. As pad-extension system 214 moves from the retracted configuration toward the expanded configuration, the spaced-apart second end of each slot 285A, 285B, 286A, 286B moves toward each associated mounting fastener 283A, 283B, 284A, 284B. In one example, each mounting fastener 283A, 283B, 284A, 284B engages the second end of each associated slot 285A, 285B, 286A, 286B when pad-extension system 214 is in the expanded position. In one example, slots 285A, 285B, 286A, 286B are arranged to lie in a generally horizontal plane.

As shown for example in FIG. 10A, movable pad support 218 is coupled to a support nose 219. Support nose 219 engages pan mount 216 when pad-extension system 214 is in the expanded configuration, the retracted configuration, and moving between the configurations. When pad-extension system 214 is expanded fully, support nose 219 rests on pan mount 216 and supports movable pad support 218. In one embodiment, pad support mover 220 is configured to fit around support nose 219. In another embodiment, a support nose is movable and is moved into position when the extension system is expanded fully. Support nose 219 increases the maximum support load of movable pad support 218 when pad-extension system 214 is in the expanded configuration. In the illustrative embodiment, as suggested by FIG. 10A, movable pad support 218 may support a load of about 890 N.

In another embodiment, a support nose may be omitted from a leg support. In this example, a leg support mover may support the leg support when the extension system is fully expanded. In another embodiment without the support nose, when the extension system is expanded fully, a mount extends out and the leg support is supported by the mount.

The invention claimed is:

1. An occupant-support base comprises
a seat pan including an outer surface adapted to face toward an occupant supported by the occupant-support base, an inner surface arranged to face opposite the outer surface away from the occupant, and a perimeter surface arranged to extend between and interconnect the inner and outer surfaces of the seat pan,
a pad coupled to the seat pan and adapted to be located between the seat pan and the occupant, the pad including an outer pad surface arranged to face away from the seat pan and an inner pad surface arranged to face toward the seat pan, and
a pad-extension system configured to provide means for moving a portion of the pad relative to the seat pan between a retracted configuration in which the pad has a first dimension as measured between a first point located on the pad and a second point located on the pad-extension system and an extended configuration in which the pad has a relatively greater second dimension as measured between the first point and the second point,
wherein the pad-extension system includes a pan mount coupled to the seat pan in a fixed position, a movable pad support coupled to the pan mount to pivot relative to the pan mount and the seat pan and coupled to the pad to cause a movable portion of the pad to move relative to the seat pan to cause the occupant-support base to move between the retracted and extended configurations, and a pad-support mover arranged to extend between and interconnect the pan mount and the movable pad support to cause the movable pad support to pivot relative to the pan mount.

2. The occupant-support base of claim 1, wherein the pad-support mover is a pneumatic actuator.

3. The occupant-support base of claim 1, wherein the pad includes a cushion cover located in spaced-apart relation to the seat pan and a cushion located between the cushion cover and the seat pan.

4. The occupant-support base of claim 3, wherein the cushion cover includes a fixed end located in a fixed position relative to the seat pan and an adjustable end located in spaced-apart relation to the fixed end and configured to move in response to movement of the movable pad support.

5. The occupant-support base of claim 1, wherein the first dimension is a depth dimension measured between an apex of the movable pad support and the perimeter surface of the seat pan.

6. The occupant-support base of claim 5, wherein the difference between the first dimension and the second dimension is about 30 mm.

7. The occupant-support base of claim 1, wherein the first dimension is a height dimension measured between the outer surface of the seat pan and an inner surface of the pad.

8. The occupant-support base of claim 1, wherein the pad-support mover is an inflatable bladder located between the movable pad support and the pan mount.

9. The occupant-support base of claim 8, wherein the pad-extension system further includes a bias unit coupled to the pan mount and arranged to interconnect the pan mount and the movable pad support to bias the movable pad support toward the pan mount in response to deflation of the inflatable bladder.

10. The occupant-support base of claim 8, wherein the pad-extension system further includes a shaft, a first rear guide pin, and a second rear guide pin and the shaft and the first and second rear guide pins are arranged to interconnect the pan mount and the movable pad support as the inflatable bladder pushes the movable pad support away from the pan mount.

11. An occupant-support base comprises
  a seat pan including an outer surface adapted to face toward an occupant supported by the occupant-support base, an inner surface arranged to face opposite the outer surface away from the occupant, and a perimeter surface arranged to extend between and interconnect the inner and outer surfaces of the seat pan,
  a pad coupled to the seat pan and adapted to be located between the seat pan and the occupant, the pad including an outer pad surface arranged to face away from the seat pan and an inner pad surface arranged to face toward the seat pan, and
  a pad-extension system configured to provide means for moving a portion of the pad relative to the seat pan between a retracted configuration in which the pad has a first dimension as measured between a first point located on the pad and a second point located on the pad-extension system and an extended configuration in which the pad has a relatively greater second dimension as measured between the first point and the second point,
  wherein the pad-extension system includes a pan mount coupled to the seat pan in a fixed position, a movable pad support coupled to the pan mount to move relative to the pan mount and the seat pan and coupled to the pad to cause a movable portion of the pad to move relative to the seat pan to cause the occupant-support base to move between the retracted and extended configurations, and a pad-support mover arranged to extend between and interconnect the pan mount and the movable cushion support to cause the movable cushion support to move relative to the pan mount,
  wherein the pad-support mover is an inflatable bladder located between the movable pad support and the pan mount,
  wherein the pad-extension system further includes a shaft, a first rear guide pin, and a second rear guide pin and the shaft and the first and second rear guide pins are arranged to interconnect the pan mount and the movable pad support as the inflatable bladder pushes the movable pad support away from the pan mount,
  wherein the pad-extension system further includes a first shaft-mount receiver and a second shaft-mount receiver located in spaced-apart lateral relation to the first shaft-mount receiver, the first and second shaft-mount receivers are coupled to the pan mount in a fixed position relative to the pan mount, and each of the first and second shaft-mount receivers is formed to include an elongated slot therein through which the shaft is arranged to extend therethrough.

12. The occupant-support base of claim 11, wherein each shaft-mount slot is arranged to extend along an angled axis, each angled axis cooperates with a vertical reference line to establish an included angle therebetween, and the included angle is in a range of about 0 degrees to about 30 degrees.

13. The occupant-support base of claim 1, wherein the pad-extension system further includes a rear guide pin coupled to the pan mount and to the movable pad support in rotative bearing engagement.

14. An occupant-support base comprises
  a seat pan including an outer surface adapted to face toward an occupant supported by the occupant-support base, an inner surface arranged to face opposite the outer surface away from the occupant, and a perimeter surface arranged to extend between and interconnect the inner and outer surfaces of the seat pan,
  a pad coupled to the seat pan and adapted to be located between the seat pan and the occupant, the pad including an outer pad surface arranged to face away from the seat pan and an inner pad surface arranged to face toward the seat pan, and
  a pad-extension system configured to provide means for moving a portion of the pad relative to the seat pan between a retracted configuration in which the pad has a first dimension as measured between a first point located on the pad and a second point located on the pad-extension system and an extended configuration in which the pad has a relatively greater second dimension as measured between the first point and the second point,
  wherein the pad-extension system includes a pan mount coupled to the seat pan in a fixed position, a movable pad support coupled to the pan mount to move relative to the pan mount and the seat pan and coupled to the pad to cause a movable portion of the pad to move relative to the seat pan to cause the occupant-support base to move between the retracted and extended configurations, and a pad-support mover arranged to extend between and interconnect the pan mount and the movable cushion support to cause the movable cushion support to move relative to the pan mount,
  wherein the pad-support mover is an inflatable bladder located between the movable pad support and the pan mount,
  wherein the pad-extension system further includes a shaft, a first rear guide pin, and a second rear guide pin and the shaft and the first and second rear guide pins are arranged to interconnect the pan mount and the movable pad support as the inflatable bladder pushes the movable pad support away from the pan mount,
  wherein the pad-extension system includes the first and second rear guide pins which are coupled to the pan mount in rotative bearing engagement and coupled to the movable pad support in rotative bearing engagement to allow the pan mount to move relative to the movable pad support,
  wherein movement of one of the first and second rear guide pins is constrained by a rear-mount guide-pin receiver included in the pan mount and a rear-support guide-pin receiver included in the movable pad support and the rear-mount guide-pin receiver is formed to include a rear cylindrical passageway therein through which the one of the first and second rear guide pins is arranged to extend there through.

15. The occupant-support base of claim 14, wherein the rear-support guide-pin receiver is formed to include a rear support slot therein, the rear support slot is arranged to extend along a rear angled axis, the rear angled axis cooperates with a vertical reference line to establish an included angle therebetween, and the included angle is in a range of about 60 degrees to about 90 degrees.

16. The occupant-support base of claim 8, wherein the pad extension system further includes a mounting arm located in spaced-apart relation to the pan mount to locate the movable pad support there between, a first fastener arranged to extend between and interconnect the pan mount and the mounting arm, and a second fastener arranged to extend between and interconnect the pan mount and the mounting arm and the mounting arm is arranged in a fixed position relative to the pan mount.

17. The occupant-support base of claim 16, wherein a first elongated slot is formed in the movable pad support, a second elongated slot is formed in the movable pad support, the first elongated slot is spaced apart from the second elongated slot, the first fastener is arranged to extend through the first elongated slot to couple to the pan mount, and the second fastener is arranged to extend through second elongated slot to couple to the pan mount.

18. The occupant-support base of claim 17, wherein the first dimension is a depth dimension measured between an apex of the movable pad support and the perimeter surface of the seat pan.

19. The occupant-support base of claim 18, wherein the difference between the first dimension and the second dimension is about 30 mm.

* * * * *